United States Patent [19]
Brinning

[11] Patent Number: 5,522,120
[45] Date of Patent: Jun. 4, 1996

[54] VARIABLE GRIPPING JAM CLEAT

[76] Inventor: David C. Brinning, 36 Old Field Rd., East Orleans, Mass. 02643

[21] Appl. No.: 319,313

[22] Filed: Oct. 6, 1994

[51] Int. Cl.⁶ .................................................... F16G 11/00
[52] U.S. Cl. ............................ 24/130; 24/129 R; 24/712.1
[58] Field of Search .................... 24/130, 129 R, 24/713.3, 713.4, 712.1, 712.9, 714.6

[56] References Cited

U.S. PATENT DOCUMENTS

| | | | |
|---|---|---|---|
| 1,761,630 | 6/1930 | Jentzen | 24/130 |
| 3,574,900 | 4/1971 | Emery | 24/130 |
| 3,812,811 | 5/1974 | Rodriguez | 24/130 |
| 4,120,077 | 10/1978 | Fink | 24/130 |
| 4,361,938 | 12/1982 | Emery | 24/130 |
| 4,553,495 | 11/1985 | Lerner | 24/130 |
| 4,787,660 | 11/1988 | Mrazek | 24/130 |
| 4,896,403 | 1/1990 | Vouros | 24/130 |
| 5,158,428 | 10/1992 | Gessner et al. | 24/712.1 |

*Primary Examiner*—Victor N. Sakran
*Attorney, Agent, or Firm*—Richard J. Birch

[57] ABSTRACT

A variable gripping jam cleat has an input end and an output end. A V-shaped groove extends longitudinally between the ends of the jam cleat. The V-shaped groove has a longitudinal axis and opposed side walls. The side walls have a number of frictional elements that provide frictional engagement with a line laid in the V-shaped groove. The frictional elements define the V-shape of the V-shaped groove with the angle of the V decreasing from the input end of the jam cleat to its output end.

15 Claims, 11 Drawing Sheets

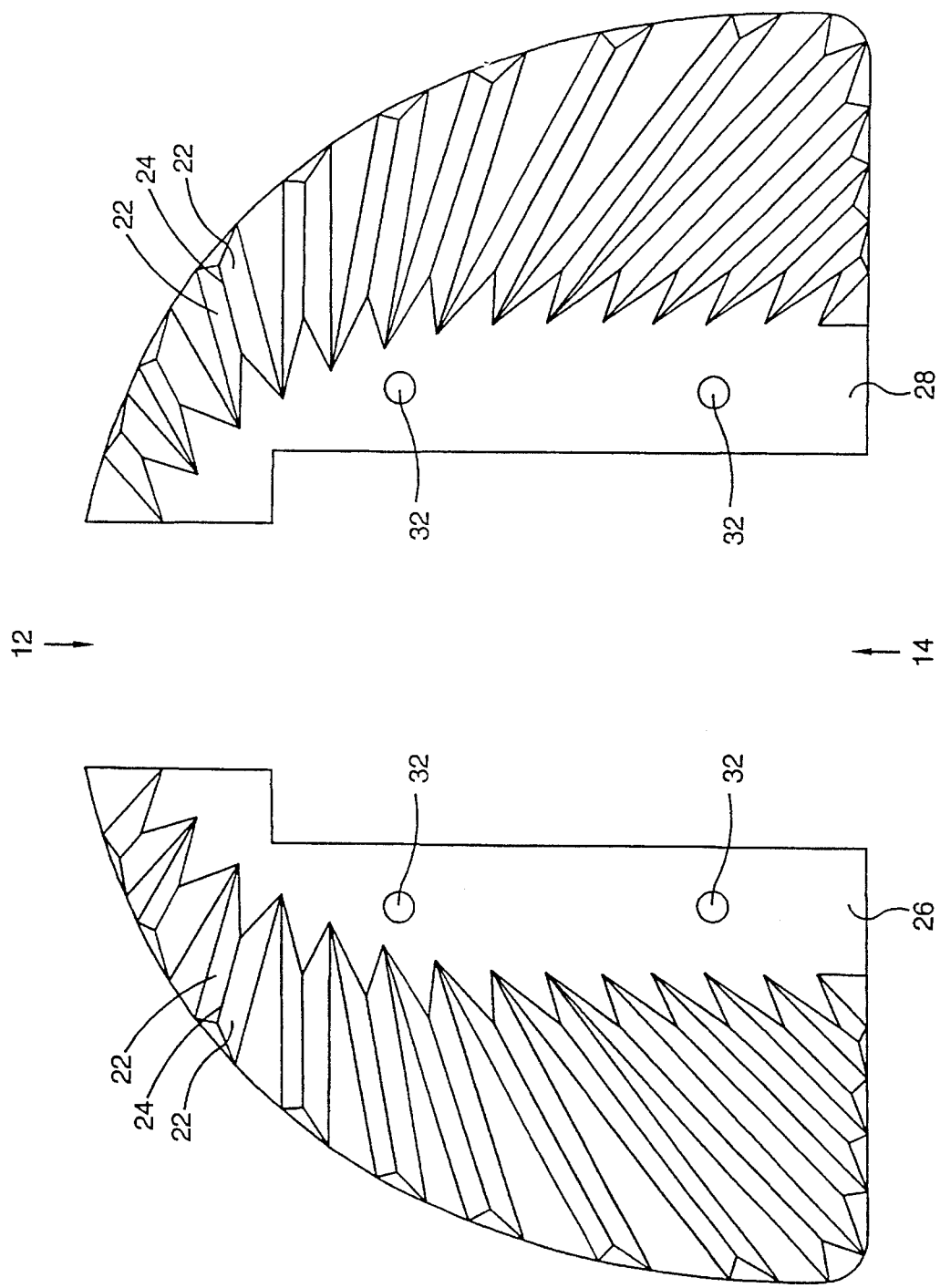

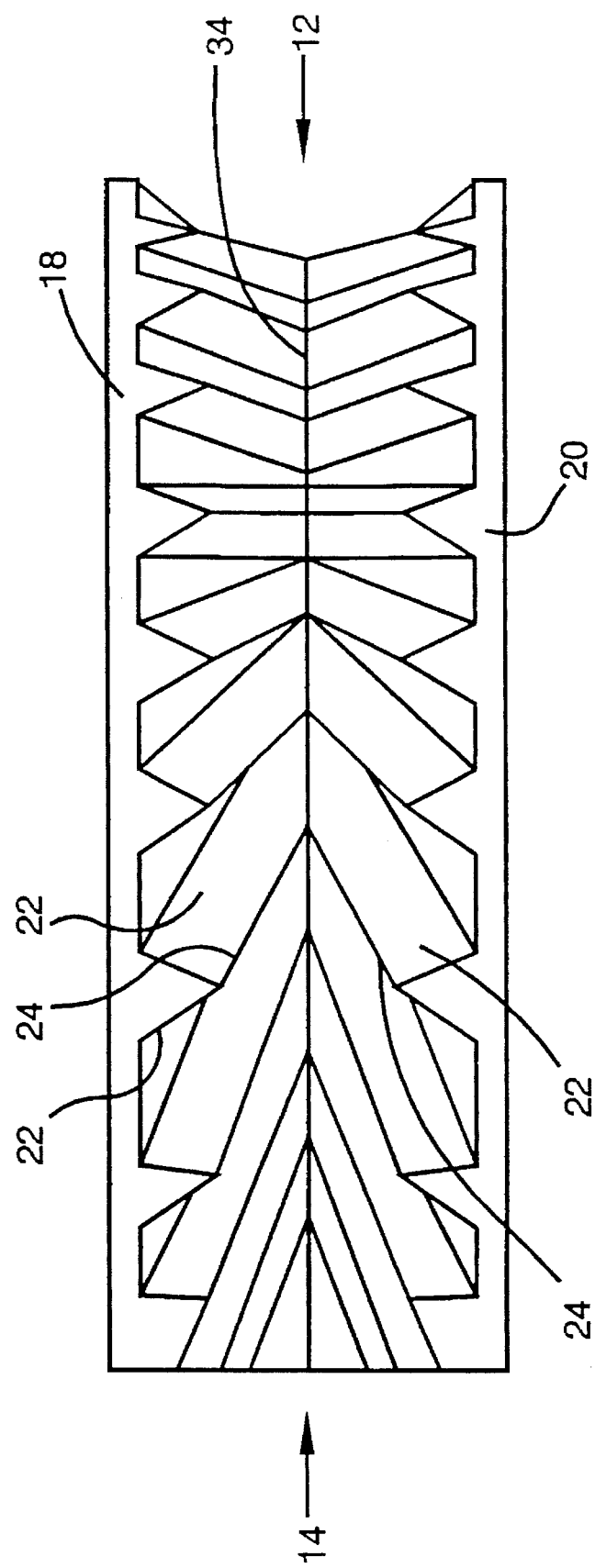
Figure 3-A

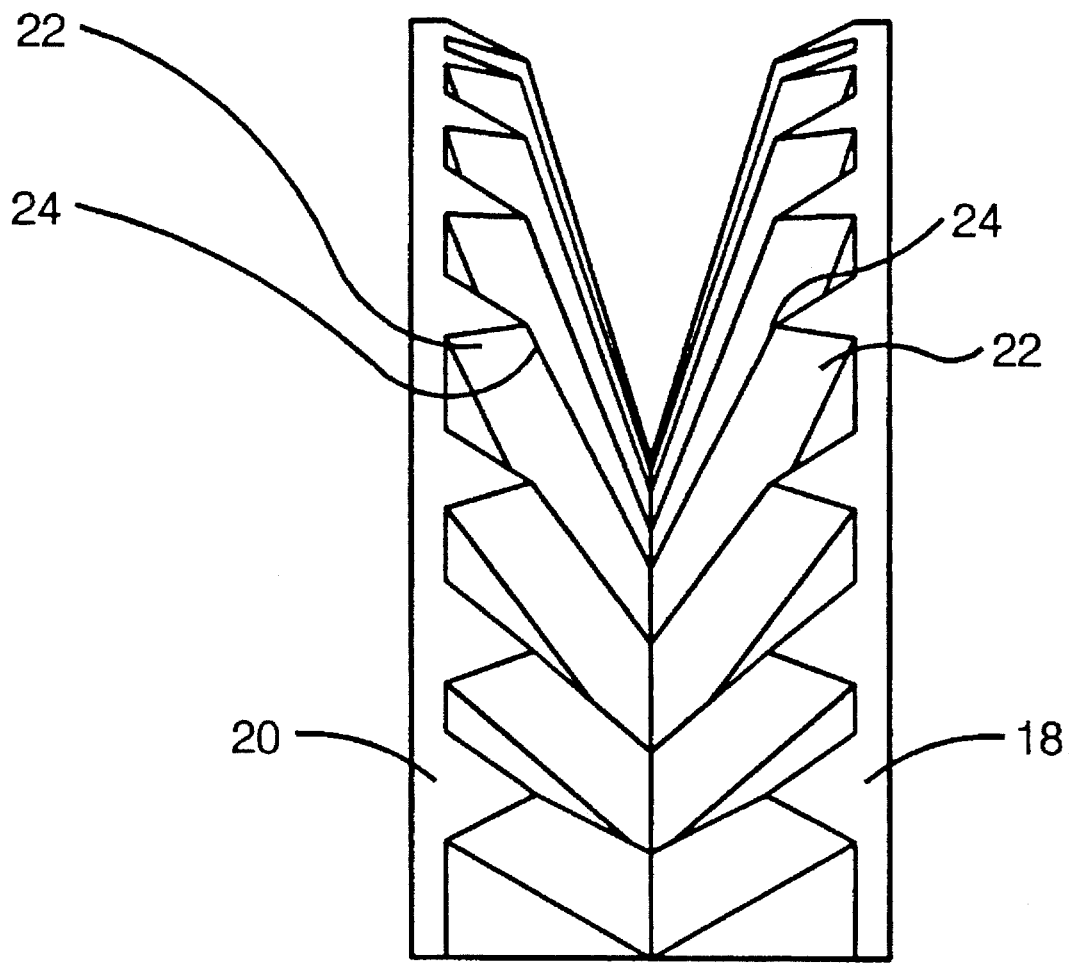
Figure 3-B

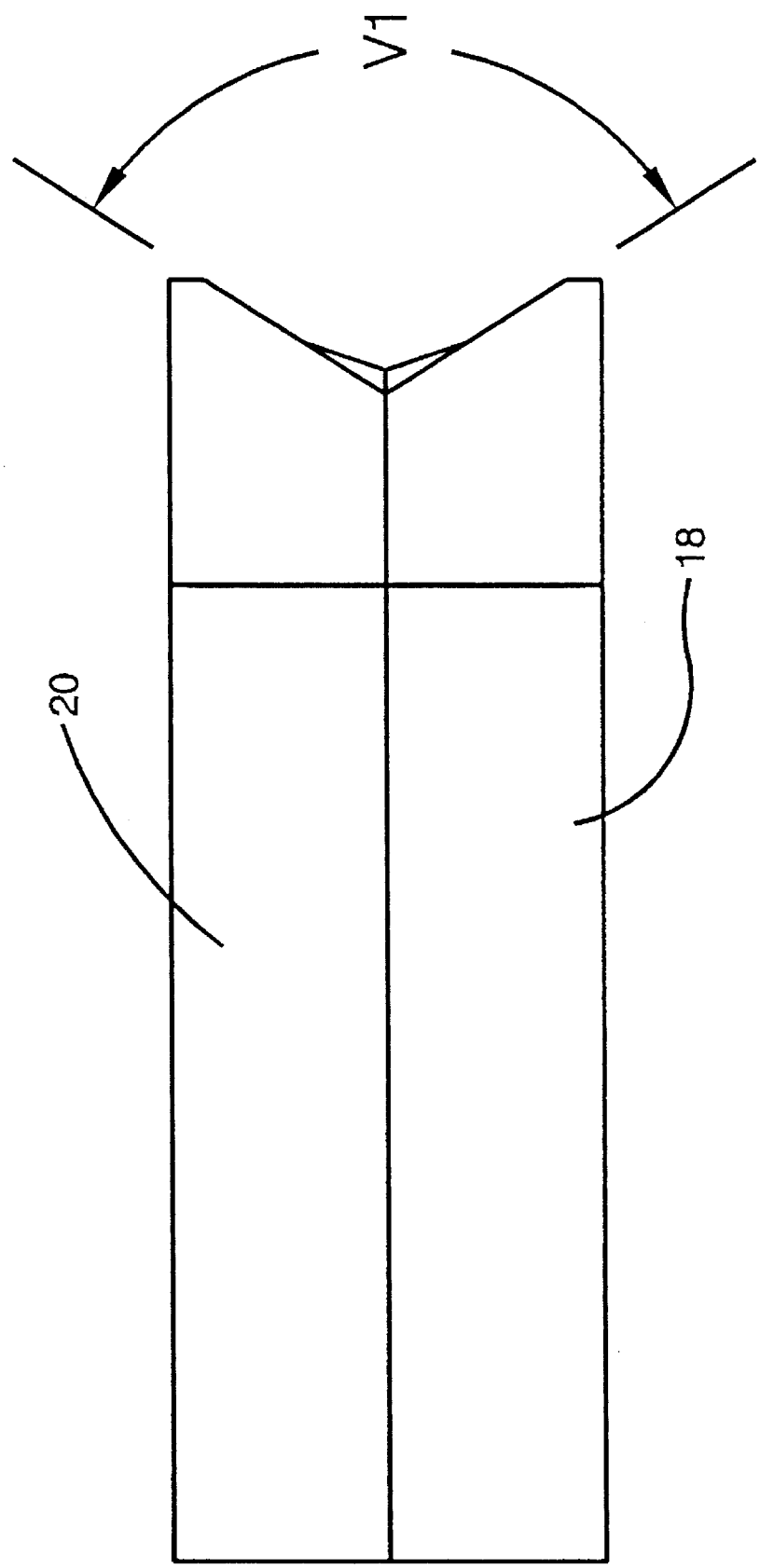
Figure 3-C

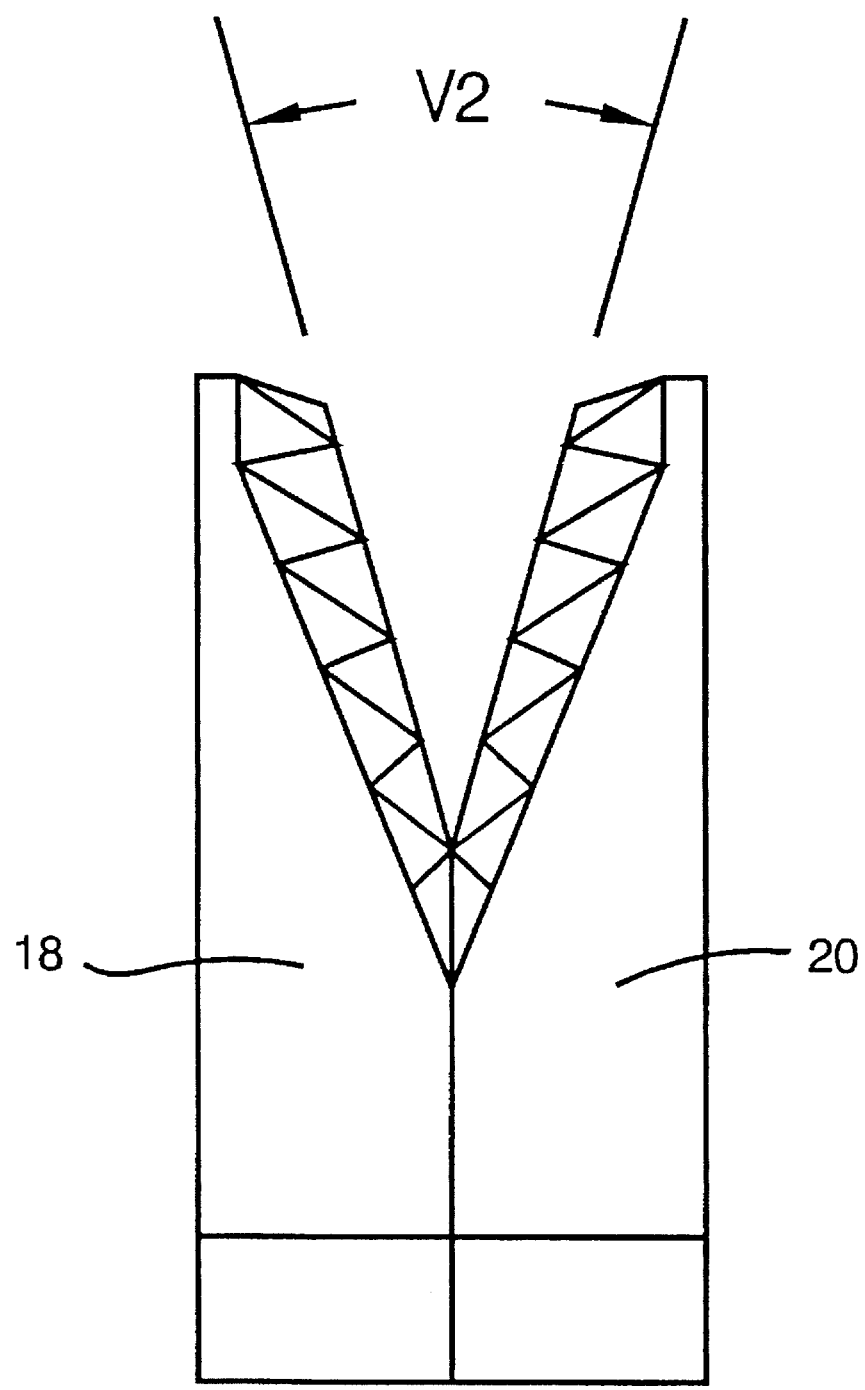
Figure 3-D

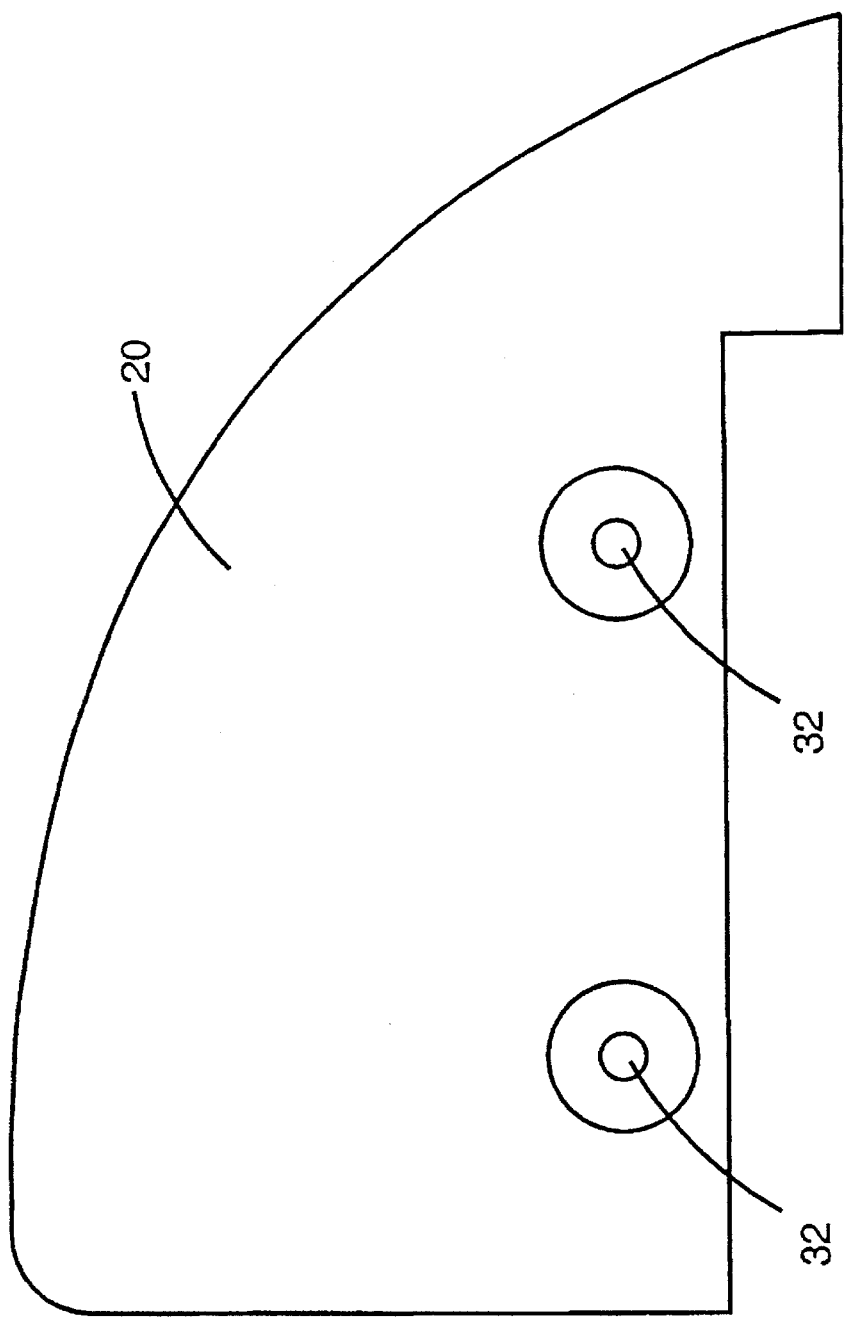
Figure 3-E

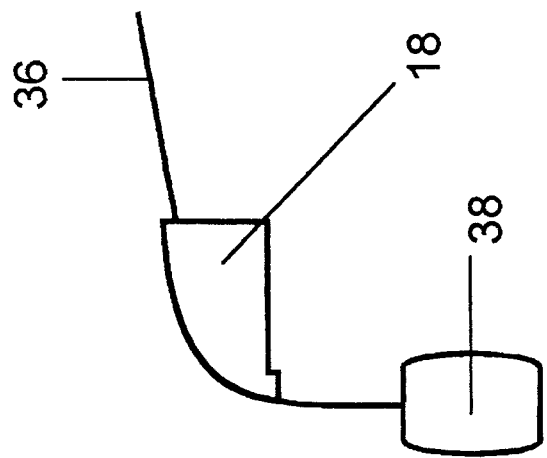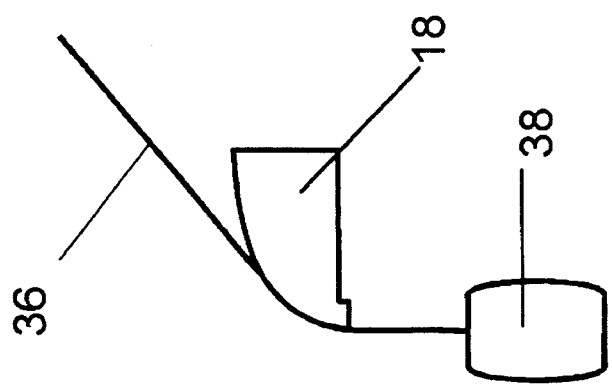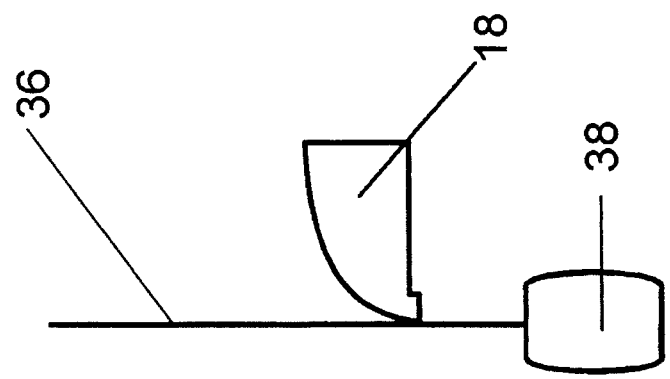
Figure 4

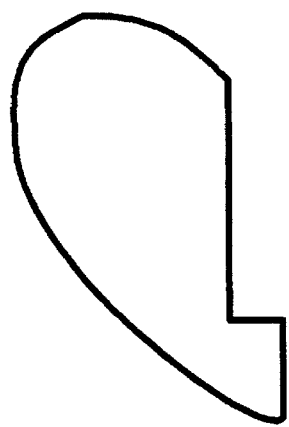
Figure 7-C
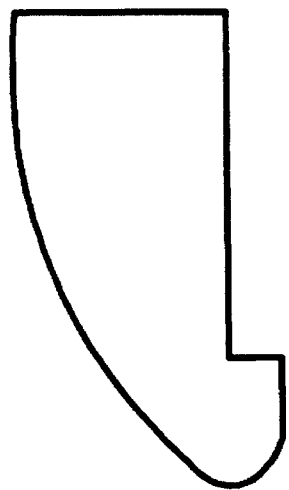
Figure 7-B
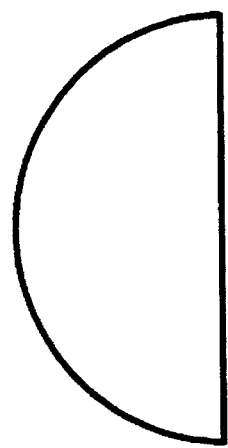
Figure 7-A
Figure 7

5,522,120

1

VARIABLE GRIPPING JAM CLEAT

BACKGROUND OF THE INVENTION

The present invention relates to cleats in general, and more particularly, to a variable gripping jam cleat.

The use of jam cleats to secure ropes, cables, lines and the like, hereinafter generally referred to as "line(s)" is well known. Representative cleats are shown in the patent literature e.g., U.S. Pat. Nos. 2,885,066, 3,574,900, 3,812,811, 4,084,532, 4,092,941, 4,120,077, 4,361,938 and U.K. Patent No. 1,191,950.

It is desirable to control the amount of "jamming" or gripping of the line by the cleat. U.S. Pat. No. 3,547,900 teaches the progressive wedging of a line in a groove when the pull on the line is increased. The groove is V-shaped with a constant angle along its longitudinal axis. A similar variable gripping cleat is disclosed in U.S. Pat. No. 4,361,938. Although these configuirations produce gripping of the line they are not an optimal geometric arrangement to provide variable tension.

It is accordingly a general object of the invention to provide a variable gripping jam cleat.

It is a specific object of the invention to provide a variable gripping jam cleat having a V-shaped groove in which the line is laid with the angle of the V decreasing from the input end of the jam cleat to its output end.

It is another object of the invention to provide a variable gripping jam cleat that permits the easy engagement and disengagement of the line from the cleat.

It is still another object of the invention to provide a variable gripping jam cleat that functions without any moving components.

SUMMARY OF THE INVENTION

The variable gripping jam utilizes a V-shaped groove that extends longitudinally from the input end to the output end of the jam cleat. The side walls have a number of frictional elements located thereon which provide frictional engagement with a line laid in the V-shaped groove. The frictional elements define the V-shape of the V-shaped groove with the angle of the V decreasing from the input end to the output end of the variable gripping jam cleat.

BRIEF DESCRIPTION OF THE DRAWINGS

The objects and features of the invention will best be understood from a detailed description of a preferred embodiment selected for purposes of illustration and shown in the accompanying drawings in which:

FIG. 2 is a view of the variable gripping jam cleat of FIG. 1 split apart into two halves looking at the inside of both halves;

FIG. 3A is a top view of the variable gripping jam cleat of FIG. 1;

FIG. 3B is a front view of the variable gripping jam cleat of FIG. 1;

FIG. 3C is a bottom view of the variable gripping jam cleat of FIG. 1;

FIG. 3D is a rear view of the variable gripping jam cleat of FIG. 1;

2

Figure 1:
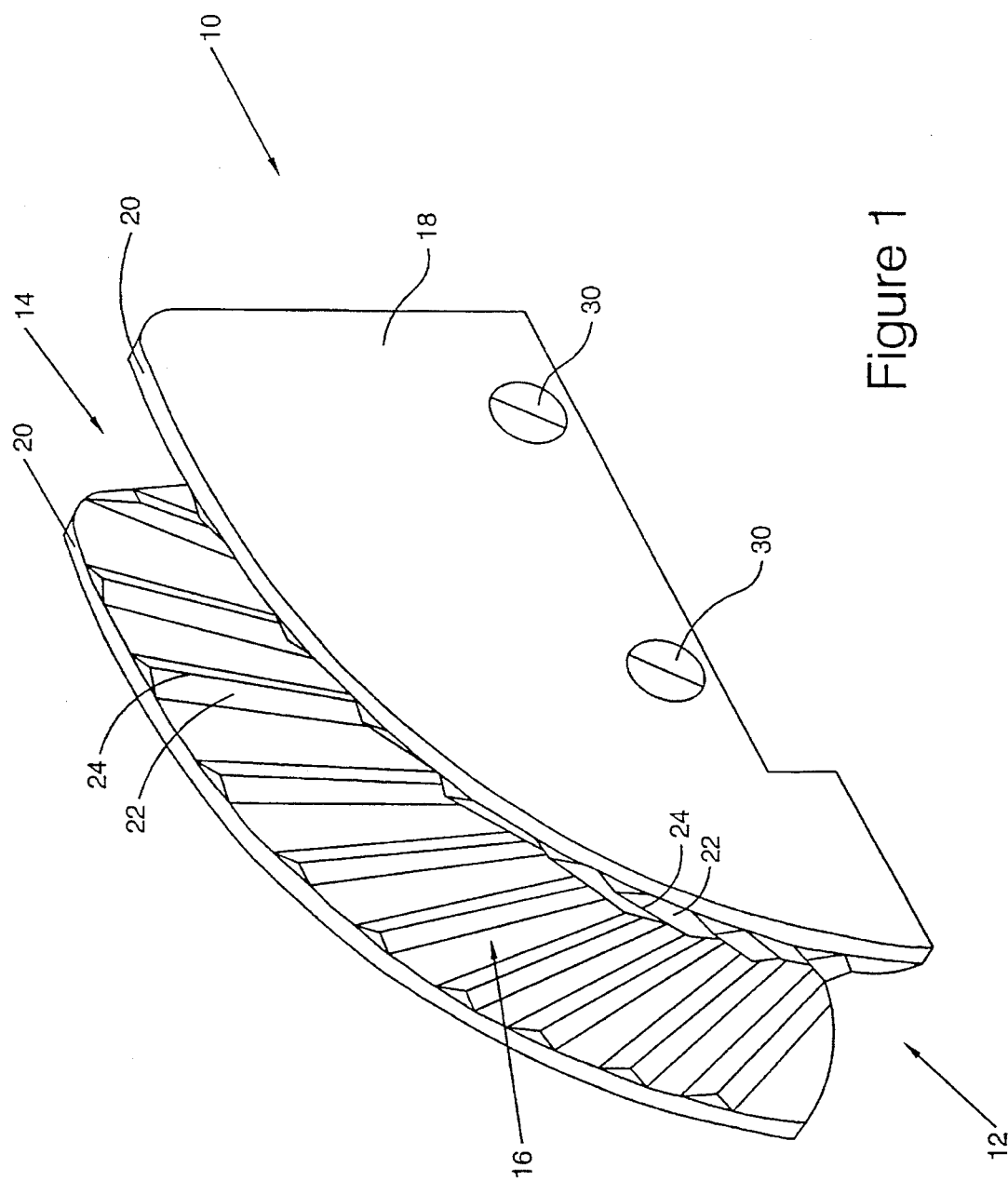
FIG. 1 is a view in perspective of the variable gripping jam cleat of the present invention.
Figure 5:
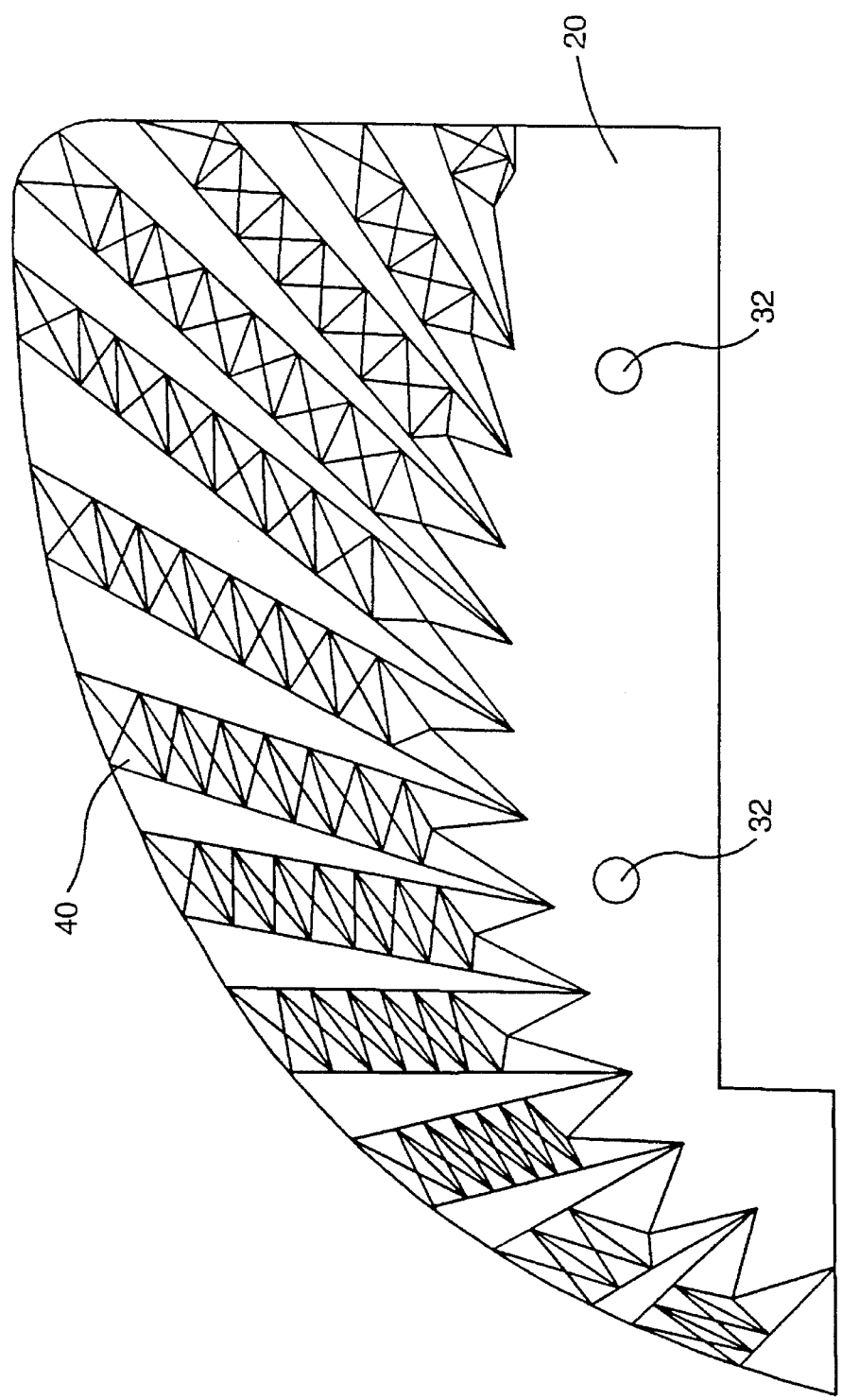
Figure 6:
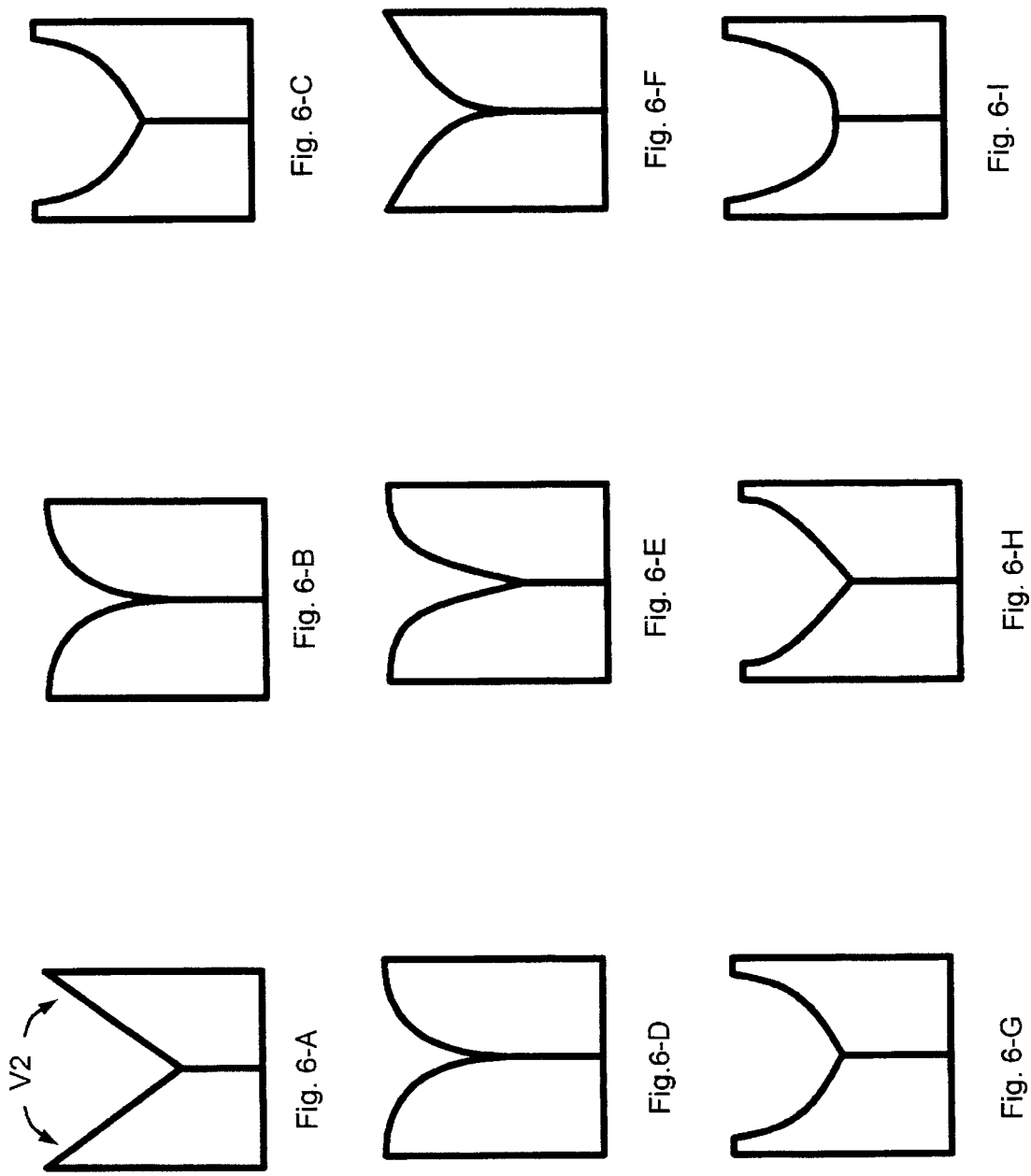

FIG. 3E is a side view of the variable gripping jam cleat of FIG. 1;

FIGS. 4A–4C are diagrammatic view in side elevation depicting the sequence of partial cleating (FIG. 4A), half cleating (FIG. 4B) and full cleating (FIG. 4C);

FIG. 5 is a view of the inside of one half of the variable gripping jam cleat showing an alternative form of line engaging frictional elements;

FIG. 6A is a diagrammatic rear view of the variable gripping jam cleat showing a flat V angle arc;

FIG. 6B is a diagrammatic rear view of the variable gripping jam cleat showing a convex V angle arc;

FIG. 6c is a diagrammatic rear view of the variable gripping jam cleat showing a concave V angle arc;

FIG. 6D is a diagrammatic rear view of the variable gripping jam cleat showing a convex V angle arc with constant radius;

FIG. 6E is a diagrammatic rear view of the variable gripping jam cleat showing a convex V angle arc with decreasing radius;

FIG. 6F is a diagrammatic rear view of the variable gripping jam cleat showing a convex V angle arc with increasing radius;

FIG. 6G is a diagrammatic rear view of the variable gripping jam cleat showing a concave V angle arc with constant radius;

FIG. 6H is a diagrammatic rear view of the variable gripping jam cleat showing a concave V angle arc with decreasing radius;

FIG. 6I is a diagrammatic rear view of the variable gripping jam cleat showing a concave V angle arc with increasing radius;

FIG. 7A is a diagrammatic side view depicting a constant radius along the longitudinal axis of the V-shaped groove;

FIG. 7B is a diagrammatic side view depicting an increasing radius along the longitudinal axis of the V-shaped groove;

FIG. 7C is a diagrammatic side view depicting a decreasing radius along the longitudinal axis of the V-shaped groove.

DETAILED DESCRIPTION OF A PREFERRED EMBODIMENT

Turning now to the drawings, and particularly to FIG. 1 thereof, there is shown in perspective view a variable gripping jam cleat constructed in accordance with the present invention and indicated generally by the reference numeral 10. The jam cleat 10 has an input end 12, an output end 14 and a V-shaped groove 16 extending between the input end 12 and output end 14. The V-shaped groove 16 is formed between sidewalls 18 and 20 each of which has a plurality of ridges 22 with ridge lines 24. The ridge lines 24 define the V-angle of the V-shaped groove 16.

Referring to both FIGS. 1 and 2, the variable gripping jam cleat 10 can be constructed as an integral molded unit or in separate halves identified in FIG. 2 as left half 26 and right half 28. The halves are secured together by means of fasteners 30 which extend through corresponding apertures 32 formed in the left and right halves 26 and 28.

Referring now to FIGS. 3A through 3E, the arc angle defined by the ridge lines 24 decreases along the longitudinal axis 34 (FIG. 3A) from the input end 12 to the output end 14. The angular relationship can be seen by comparing the relatively broad input end angle $V_1$ with the relatively narrow angle $V_2$ at the output end 14 of the jam cleat 10. The cleat 10 can be mounted such that the curve of the longitudinal axis affords leverage which forces the line deeper into the wider $V_1$ angle.

The decreasing angle from input $V_1$ to output $V_2$ provides a variable gripping of a line 36 as shown diagrammatically in FIGS. 4A–4C. FIG. 4A depicts the partial cleating of line 34 which is secured to a weight 38 that represents a force perpendicular to the longitudinal axis of the V-shaped groove 16. FIGS. 4B and 4C illustrate a half cleating position and a full cleating position of line 34, respectively.

It will be appreciated that the ridge lines 24 provide a frictional engagement with a line laid in the V-shaped groove 16. Other devices can be used to provide such frictional engagement. For example, as shown in FIG. 5, a plurality of gripping elements 40 in the form of pyramids are provided on the sidewalls of the jam cleat.

The actual shape of the V-shaped groove 16 can take a variety of configurations as shown in FIGS. 6A through 6I. FIG. 6A illustrates the flat V-angle arc shown in the preceding Figures. The V-angle arc can be convex (FIG. 6B), concave (FIG. 6C) and can have a constant, decreasing or increasing radius as illustrated in FIGS. 6D–6G, (6E–6H) and FIGS. 6F–6I, respectively.

In a similar manner, the radius of the longitudinal axis of the V-shaped groove can be constant, increasing or decreasing, as depicted in FIGS. 7A, 7B and 7C, respectively.

Having described in detail a preferred embodiment of my invention, it will now be obvious to those skilled in the art that numerous modifications can be made therein without departing from the scope of the invention as defined in the following claims.

What I claim is:

1. A variable gripping jam cleat having an input end, an output end and a V-shaped groove extending longitudinally from said input end to said output end, said V-shaped groove having a longitudinal axis and opposed side walls and frictional means located on said opposed side walls for providing frictional engagement with a line laid in said V-shaped groove, said frictional means defining the V shape of the V-shaped groove with the vortex angle of the V decreasing from the input end to the output end along the longitudinal axis of said V-shaped groove.

2. The variable gripping jam cleat of claim 1 wherein the longitudinal axis is arcuate.

3. The variable gripping jam cleat of claim 2 wherein the arcuate longitudinal axis has a constant radius.

4. The variable gripping jam cleat of claim 2 wherein the arcuate longitudinal axis has a varying radius.

5. The variable gripping jam cleat of claim 4 wherein the radius of the arcuate longitudinal axis increases from the input end to the output end of the longitudinally extending V-shaped groove.

6. The variable gripping jam cleat of claim 4 wherein the radius of the arcuate longitudinal axis decreases from the input end to the output end of the longitudinally extending V-shaped groove.

7. The variable gripping jam cleat of claim 1 wherein said frictional means comprises a plurality of gripping elements located on the opposed side walls, said plurality of gripping elements defining the V shape of the V-shaped groove with the angle of the V defined by said gripping elements decreasing from the input end to the output end.

8. The variable gripping jam cleat of claim 1 wherein said frictional means comprises a plurality of angled ridges located on the opposed side walls and a corresponding plurality of ridge lines, said plurality of ridge lines defining the V shape of the V-shaped groove with the angle of the V defined by said ridge lines decreasing from the input end to the output end.

9. The variable gripping jam cleat of claim 1 wherein the V-shaped groove has a flat V angle arc.

10. The variable gripping jam cleat of claim 1 wherein the V-shaped groove has a convex V angle arc with a decreasing radius.

11. The variable gripping jam cleat of claim 1 wherein the V-shaped groove has a concave V angle arc with a decreasing radius.

12. The variable gripping jam cleat of claim 1 wherein the V-shaped groove has a convex V angle arc with an increasing radius.

13. The variable gripping jam cleat of claim 1 wherein the V-shaped groove has a concave V angle arc with an increasing radius.

14. The variable gripping jam cleat of claim 1 wherein the V-shaped groove has a convex V angle arc with a constant radius.

15. The variable gripping jam cleat of claim 1 wherein the V-shaped groove has a concave V angle arc with a constant radius.

* * * * *